Jan. 13, 1970  J. LAURENT  3,489,995

PRESSURE TRANSDUCER

Filed May 9, 1968  4 Sheets-Sheet 1

INVENTOR
JEAN LAURENT

BY Craig & Antonelli

ATTORNEYS

Jan. 13, 1970  J. LAURENT  3,489,995
PRESSURE TRANSDUCER

Filed May 9, 1968                                    4 Sheets-Sheet 2

INVENTOR
JEAN LAURENT

BY Craig & Antonelli

ATTORNEYS

INVENTOR
JEAN LAURENT

United States Patent Office 3,489,995
Patented Jan. 13, 1970

3,489,995
PRESSURE TRANSDUCER
Jean Laurent, Germain-en-Laye, France, assignor to Institut Francais du Petrole, des Carburants et Lubrifiants, Rueil Malmaison, Hauts-de-Seine, France
Filed May 9, 1968, Ser. No. 727,953
Claims priority, application France, May 16, 1967, 106,637; Nov. 14, 1967, 128,199; Mar. 26, 1968, 145,515
Int. Cl. H04r 7/12, 17/00
U.S. Cl. 340—14            16 Claims

ABSTRACT OF THE DISCLOSURE

The present disclosure is directed to a pressure transducer of small dimensions and high sensitivity for picking up pressure waves, particularly pressure waves produced in a body of water. The pressure transducer of the present disclosure is composed of elements which can be readily changed when necessary, thereby saving time and reducing cost.

---

This invention relates to a new pressure transducer for picking up pressure waves, of small dimensions and high sensitivity, specially adapted to the picking up of pressure waves produced into a water body.

It is composed of elements which are simple by themselves and all removable, so that any element can be changed if needed, which has the advantage of saving time and reducing the cost as compared to the case of a transducer whose constitutive elements cannot be changed.

The pressure transducer according to this invention comprises a transducer body of a substantially cylindrical shape, a first electrode having a cylindrical portion and a circular plane portion, said cylindrical portion surrounding, on one part of its height, the transducer cylindrical body, a free space being provided between said electrode and said transducer body, and a pressure sensitive element in the form of a plate, the sides of which are respectively in contact with said first electrode and a second electrode provided on the side opposite to the transducer body with respect to said first electrode.

Figure 1:
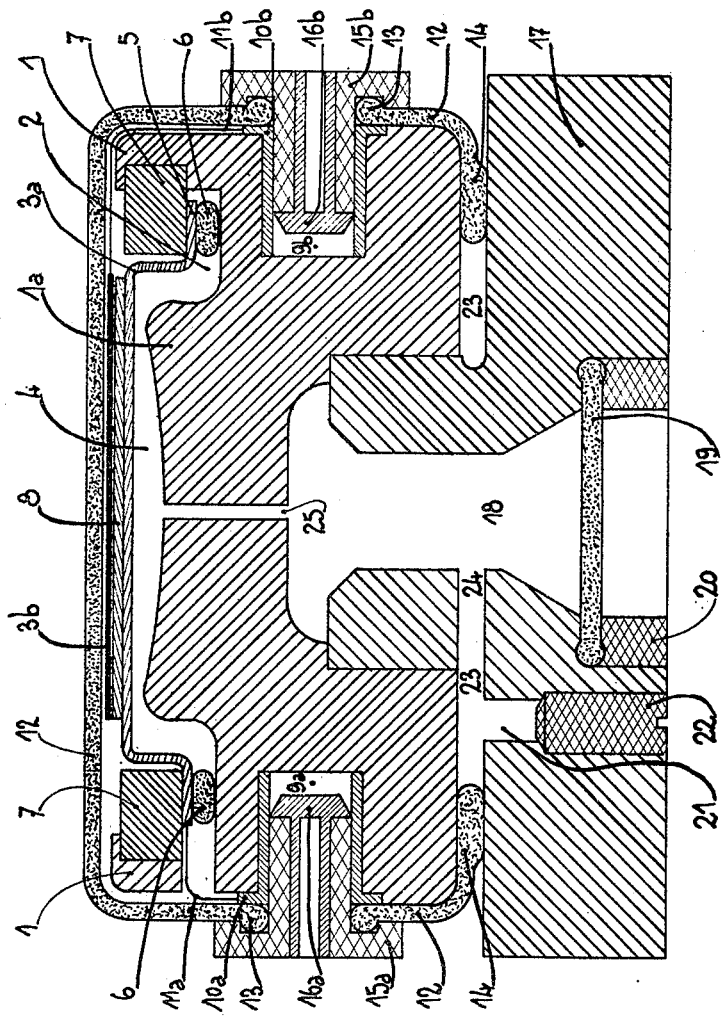
Figure 2:
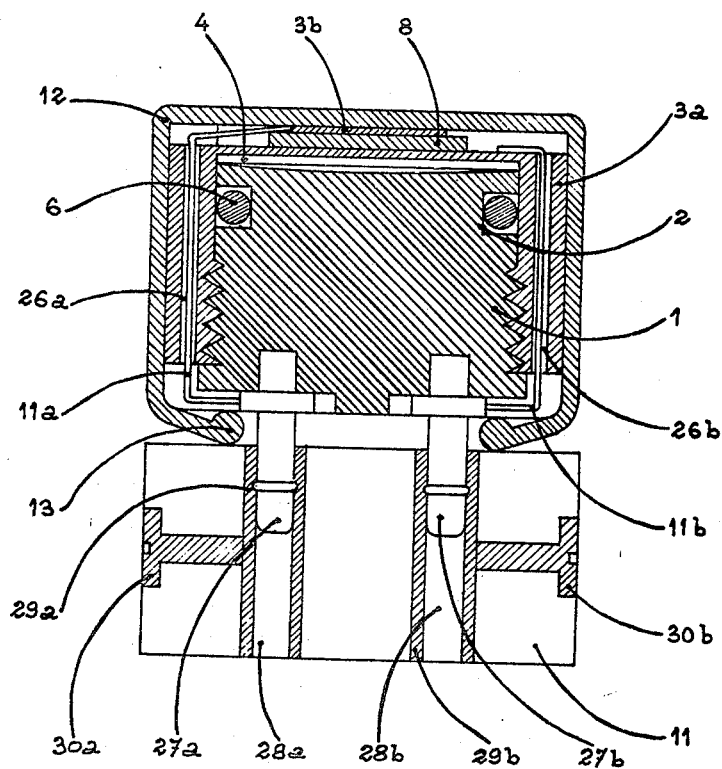
Figure 3:
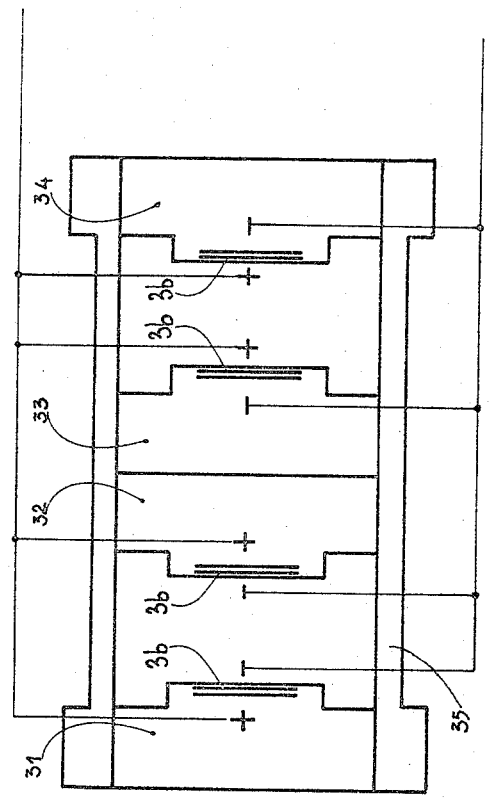
Figure 4:
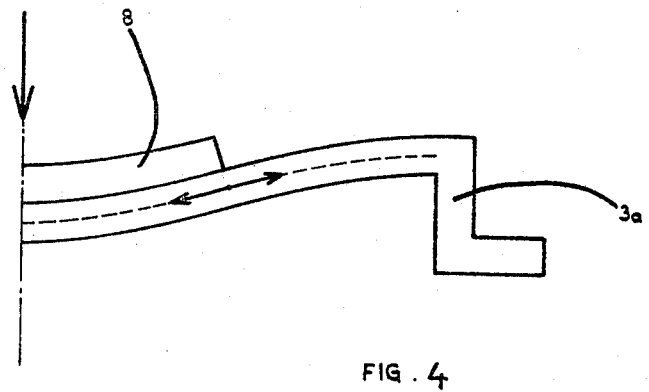
Figure 5:
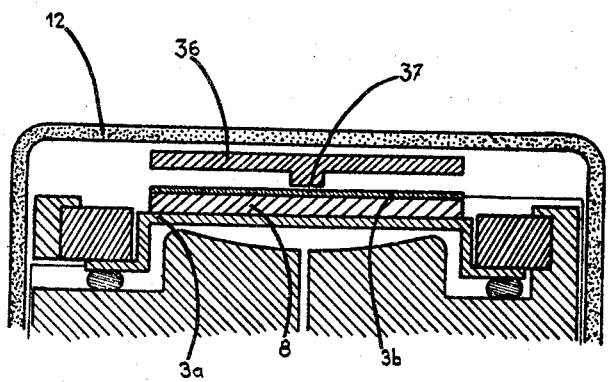

Such a pressure transducer will be more fully described with reference to the accompanying drawings wherein:

FIGURE 1 shows a cross-sectional view of a first embodiment of the pressure transducer, FIGURE 2 shows a cross-sectional view of a second embodiment of pressure transducer, FIGURE 3 shows diagrammatically the assembly composed of a plurality of pressure transducers according to this invention, FIGURE 4 diagrammatically shows the position of the pressure sensitive element with respect to its supporting electrode, and FIGURE 5 represents a partial cross-sectional view of a third embodiment of pressure transducer.

In the embodiment shown in FIGURE 1, the new pressure transducer essentially comprises a transducer body 1 of substantially cylindrical shape, used as a support for a certain number of elements of the assembly, and provided with recesses for the housing and the fixing of such elements.

An annular groove 2 is provided in one of the terminal faces of the transducer body. A first electrode 3a, in the form of a circular cover plate, comprises a cylindrical wall and a plane wall. The plane wall must be very thin whereas, on the contrary, the cylindrical wall will be advantageously thicker so as to give sufficient strength to said electrode. This electrode, for instance of metal, encases the central portion 1a of the transducer body, delimited by the annular groove 2, while leaving a free space 4 between elements 3a and 1a. The circular edge 5 of electrode 3a is maintained separated from the transducer body by means of a toric joint 6 housed in the bottom of the annular groove 2. An annular locking nut 7 is screwed in said groove for securing electrode 3a on the transducer body.

A sensitive element 8, for instance a very thin piezoelectric crystal of circular shape, is secured on the circular central portion of electrode 3a. A second electrode 3b, for instance a metal circular piece, is secured on the sensitive element on the side thereof opposite to the side in contact with electrode 3a.

Two cylindrical cavities 9a and 9b are formed in the lateral wall of the transducer body 1. These cavities are each provided with a rivet, 10a and 10b of conducting material, which rivets are connecting respectively to electrodes 3a and 3b through conductor elements 11a and 11b.

The assembly formed by the above states elements is enclosed in an outer cover 12 of elastic and insulating material, transparent to acoustic waves, provided with orifices corresponding to the cavities 9 of the transducer body. A toric protrusion 13 forms the edge of these orifices. The cover is also provided with a toric protrusion 14 on its terminal circular edge on the side of the transducer body opposite to that of the crystal.

Cavities 9 and 9a are each obturated by a plug 15a, 15b preferably of insulating material, provided with a conducting part 16a, 16b forming a contact with the corresponding rivet 10a, 10b. Conductors, not shown in the figure, which are connected to these contacts, will form the electric output of the transducer. The toric protrusions 13, crushed by the heads of the plugs 15 ensure a good tightness between the elements on both sides of the cover 12.

The transducer body 1 is secured, on the side opposite to that of the crystal, to a cylindrical member 17 provided with a central cavity 18, obturated, on the side thereof opposite to the transducer body, by a tight and elastic diaphragm 19, locked by means of an annular nut 20. A duct 21, provided inside member 17, is obturated at will be means of a plug 22. An annular space 23 is still maintained between the transducer body 1 and the member 17. It is limited at its periphery by the toric protrusion 14 of the cover 12, ensuring tightness between said space and the external medium.

A channel 24, provided into member 17 establishes communication between space 23 and the cavity 18. A very thin capillary channel 25 is provided through the transducer body 1 so as to interconnect cavity 18 and space 4.

When the different elements of the transducer are assembled, it can be advantageously introduced in channel 21 a liquid ensuring a good transmission of the pressure waves, oil for instance. This liquid runs through space 23 to cavity 18 through channel 24 and to space 4 via channel 25.

The liquid filling the interior of the transducer is subjected to the external pressure (hydrostatic pressure) through the intermediary of diaphragm 19. The pressure of this liquid, exerted on the internal face of electrode 3a, prevents a bending stress of the crystal 8. The capillary channel 25 only gives way to the low frequencies of the acoustic signal, as it is already known.

The transducer as hereabove described in the preceding example, comprises, as already mentioned, an oil container communicating with the free space between electrode 3a and the central portion of the transducer body.

According to another embodiment of the transducer, illustrated in FIGURE 2, no oil container is provided, this resulting in a simpler arrangement of the device. Another shape for electrode 3a also provides further simplifications.

Referring now to FIGURE 2, the transducer body 1 of substantially cylindrical shape, forming a support for the various elements of the assembly as well as in the first embodiment.

The body 1, which can be made of plastic material, for example, is provided on its cylindrical wall, with a circular groove 2 housing a toric joint 6. A first electrode 3a, in form of a circular cover plate comprising a cylindrical wall and a plane wall, encases the body 1 of the transducer, for instance by screwing or pawl-and-ratchet engagement, while leaving a free space 4 between its plane portion and element 1. The tightness of said space is ensured by means of a toric joint 6. The electrode 3a may be realized either in a conducting material or in a non-conducting material with a conducting coating such as for example a moulded plastic material with its external plane surface covered with a conducting coating. Its plane portion must be thin whereas, on the contrary its cylindric portion may be thicker. The particular shape of this electrode provides for a rigidity preventing any deformation in another direction than that of the arrival of the pressure waves. The free space between the electrode 3a and the transducer body must be such that the maximum of resiliency of said electrode is not reached when the latter comes into contact with the transducer body.

A sensitive element 8, for instance a very thin piezoelectric crystal of circular shape, is secured to the central portion of the plane wall of electrode 3a.

A second electrode 3b, for instance a circular metal element, is secured on the sensitive element on the side thereof opposite to electrode 3a. Two passageways 26a and 26b are provided into the cylindrical wall of electrode 3a for the passage of conductors 11a and 11b respectively connecting electrodes 3a and 3b to the terminals 27a and 27b integral with the transducer body 1. These terminals may consist of conducting elements enclosed in the transducer body on the side thereof opposite to the sensitive element.

The assembly of the above-mentioned elements is enclosed in a sheath or cover 12 of elastic and insulating material, transparent to the acoustic waves, provided with a protruding ring 13, bearing on the side of the transducer body which is opposed to the sensitive element and which maintains the sheath or cover in position.

The protruding ring 13 of the sheath is crushed between the transducer body 1 and a piece 17 of cylindrical shape, provided with two cavities 28a, 28b each lined with a liner of conducting material 29a, 29b, wherein are engaged respectively the terminals 27a, 27b. The liners 29a, 29b are also connected to other terminals 30a, 30b to be connected to the electric outputs of the transducer, not shown. It can be seen that the assembling of such a hydrophone is very simple and may be achieved with the only use of elements of small dimensions. It is to be observed, particularly in this embodiment, that the special shapes of electrode 3a and of the transducer body, make it possible to avoid the use of any intermediary fixing means (such as nut 7 in the first embodiment).

A transducer conforming with the first or the second embodiment, besides the advantages of a high sensitivity, simplicity of assembling and ability to be completely disassembled, still offers further advantages. As a matter of fact, its arrangement makes possible the assembling of a plurality of transducers of the same type along the same longitudinal axis, so as to eliminate both the static pressure components and the effects of accelerations to which are subjected the transducers when towed from a mobile installation.

The principle of acceleration compensation between transducers being known as such, the transducers according to the invention make possible a particularly simple application of said principle, as illustrated diagrammatically in FIGURE 3.

According to this diagram, four transducers 31, 32, 33 and 34 are distributed along the same longitudinal axis and rigidly connected to each other by means of a common sheath 35, transparent to the acoustic waves, in the manner illustrated in FIGURE 2.

Their electric outputs are interconnected in such a manner that in a pair of transducers whose sensitive elements 8 are facing each other, the external electrodes 3b are interconnected and correspond to a negative terminal, whereas the internal electrodes 3a, which are also interconnected, correspond to the positive terminal, and in the adjacent pair of transducers whose sensitive elements are also facing each other, the external electrodes 3b are interconnected and correspond to a positive terminal, whereas the internal electrodes 3a, which are also interconnected, correspond to the negative terminal.

The transducers of said assembly being all identical, a defective transducer can be replaced easily if necessary and at low cost, whereas in the case of a transducer having two sensitive elements integral with the same transducer body such a replacement is more difficult.

Moreover, researches have been carried out in order to impose the sensitivity of the transducer according to the invention. It has been discovered that some particular arrangements resulted in an increased sensitivity.

In particular it has been observed, everything else being kept unchanged, that it was advantageous to choose the sensitive element 8 (FIGURE 4) of a diameter at most equal to that of the central portion of electrode 3a, said central portion being delimited by the circumference locus of the points of inflexion of said electrode under action of the maximal pressure to which can be subjected the transducer in conditions of use.

By way of example it can be observed that, with an electrode 3a, whose central portion has a diameter of 26 mm., satisfactory results have been achieved by use of a sensitive element of a 20 mm. diameter.

It has moreover been discovered that the transducer sensitivity was increased when complying with a certain ratio between the thickness of the central portion of electrode 3a and the thickness of the sensitive element.

The thickness of the electrode being designated by $e_{3a}$ and the thickness of the sensitive element by $e_8$, the ratio $e_8/e_{3a}$ will be advantageously comprised between 1.5 and 1. For example, a brass electrode of a 16 mm. diameter and 0.2 mm. thickness in association with a sensitive element of a 0.3 mm. thickness gives good results.

Still another particular ararngement of the above-described transducers provides for an increase of the sensitivity of said transducer.

In the case of the above-described transducers, the pressure of the acoustic waves is transmitted to the assembly formed by the sensitive element 8 and the electrodes 3a and 3b, on the entirety of the surface thereof, through the intermediary of the sheath or cover 12.

According to a further embodiment illustrated in FIGURE 5, the pressure of the acoustic waves is applied to the sensitive element substantially at the center thereof.

A circular plate member 36, whose diameter is substantially equal to that of electrode 3b and which comprises a central protrusion 37, is placed between said sheath 12 and electrode 3b, said protrusion 37 bearing on said electrode in the central part thereof.

The pressure of the acoustic waves received on the totality of plate 36 is thus concentrated on the central part of electrode 3b and mainly in the central area of the associated sensitive element. A substantial increase in the sensitivity of the transducer is thereby obtained.

What is claimed as this invention is:

1. A pressure transducer, comprising a transducer body having a substantially cylindrical wall, a first electrode composed of a cylindrical part and a circular plane part, said cylindrical part enclosing, on a part of its height, the transducer cylindrical body, a free space provided between said electrode and the transducer body, and a sensitive element in the form of a plate whose faces are respectively in contact with said first electrode and a second electrode placed on the side opposite to the transducer body with respect to said electrode.

2. A pressure transducer according to claim 1, wherein the thickness of said free space is less than the maximum amount of elastic flexion of the plane part of said first electrode.

3. A pressure transducer to claim 1, which further comprises a supple and deformable sheath, provided with at least one toric joint, encasing the assembly formed by the transducer body, the sensitive element and the electrodes.

4. A pressure transducer according to claim 1 which further comprises at least two conducting terminals having one end secured to the transducer body.

5. A pressure transducer according to claim 1, wherein the cylindrical wall of the first electrode comprises longitudinal passages for the electric conductors connected to said first and to said second electrode.

6. A pressure transducer according to claim 1, wherein the plane part of said first electrode is thin with respect to its cylindrical part.

7. A pressure transducer according to claim 1 wherein the cylindrical part of the first electrode and the cylindrical wall of the transducer body are provided with elements for mutual fixing.

8. A pressure transducer according to claim 1, wherein the cylindrical wall of the transducer body comprises a groove housing a toric joint in continuous contact with the cylindrical part of said first electrode.

9. A pressure transducer according to claim 4, wherein the other end of the conducting terminals is secured to a piece comprising conducting elements electrically connected to said terminals.

10. A pressure transducer according to claim 1, which further comprises a capillary channel and a piece with a central cavity provided with an elastic diaphragm, said piece being secured on the transducer body so that the central cavity communicates with the channel inside the transducer body, this diaphragm providing for an equilibrium of the pressures respectively prevailing inside and outside the transducer.

11. A pressure transducer according to claim 1, wherein the first electrode comprises an annular edge, extending in a plane substantially parallel to its circular plane part, and secured to the transducer body.

12. A pressure transducer according to claim 1, wherein the diameter of the sensitive element is at most equal to the diameter of the circumference delimited by the points of inflexion of said first electrode under action of the maximum pressure attainable under conditions of use.

13. A pressure transducer according to claim 1, wherein the thickness of the sensitive element is between 1 and 1.5 times the thickness of the plane wall of the first electrode.

14. A device comprising a plurality of pressure transducers according to claim 1, wherein the transducers are arranged by pairs, the sensitive elements of a pair facing each other, the polarity of said elements being changed in turn from one pair of transducers to the other and electrodes of the same polarity being all interconnected.

15. A pressure transducer comprising a transducer body having a substantially cylindrical wall and an end wall, a first electrode composed of a cylindrical part and a circular plane part, said cylindrical part surrounding, on a part of its height, the transducer cylindrical body, said circular plane part being flexible in a direction substantially perpendicular to said plane part and said cylindrical part being rigid and substantially undistortable, a free space provided between said electrode plane part and the transducer body end wall, and sensitive element in the form of a plate whose faces are respectively in contact with said first electrode plane part and a second electrode on the side opposite to the transducer body end wall with respect to said electrode.

16. A pressure transducer according to claim 15, wherein said flexible circular plane part and said rigid cylindrical part are made of the same material and are of different thicknesses.

References Cited

UNITED STATES PATENTS 3,048,815  8/1962  Thurston et al. _____ 340—10
3,365,593  1/1968  Root et al. _____ 340—10 X RICHARD A. FARLEY, Primary Examiner B. L. RIBANDO, Assistant Examiner U.S. Cl. X.R.

340—10